(12) United States Patent
Futagami et al.

(10) Patent No.: US 9,088,548 B2
(45) Date of Patent: *Jul. 21, 2015

(54) STREAMING SYSTEM AND METHOD

(71) Applicant: Sony Corporation, Tokyo (JP)

(72) Inventors: Motomasa Futagami, Kanagawa (JP);
Tatsumi Sakaguchi, Kanagawa (JP);
Masato Horiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,788

(22) Filed: Oct. 9, 2013

(65) Prior Publication Data
US 2014/0040613 A1  Feb. 6, 2014

Related U.S. Application Data

(63) Continuation of application No. 13/243,694, filed on Sep. 23, 2011, now Pat. No. 8,583,927, which is a continuation of application No. 10/498,815, filed as application No. PCT/JP03/13867 on Oct. 29, 2003, now Pat. No. 8,572,380.

(30) Foreign Application Priority Data

Nov. 1, 2002 (JP) .................................. 2002-320465

(51) Int. Cl.
*H04L 29/06* (2006.01)
*H04L 9/00* (2006.01)
(Continued)

(52) U.S. Cl.
CPC .............. *H04L 63/0428* (2013.01); *H04L 9/00* (2013.01); *H04N 7/1675* (2013.01);
(Continued)

(58) Field of Classification Search
CPC .... H04L 63/12; H04L 63/164; H04L 63/0428
USPC ......................................................... 726/160
See application file for complete search history.

(56) References Cited

U.S. PATENT DOCUMENTS 5,835,726 A    11/1998  Shwed et al.
6,983,049 B2 *  1/2006  Wee et al. ..................... 380/200
(Continued)

FOREIGN PATENT DOCUMENTS

CN        1371056 A      9/2002
JP      2001-197120      7/2001
(Continued)

OTHER PUBLICATIONS

Susie J. Wee and Jhon G. Apostolopoulos, Secure Scalable Streaming Enabling Transcoding without Decryption, Proc. of 2001 International Conference on Image Processing, vol. 1, pp. 437-440, Oct. 7, 2001, especially 2.4 SSS Coding and SSS Transcoding.

(Continued)

*Primary Examiner* — Hadi Armouche
*Assistant Examiner* — Shahriar Zarrineh
(74) *Attorney, Agent, or Firm* — Oblon, McClelland, Maier & Neustadt, L.L.P.

(57) ABSTRACT

A streaming system includes an authoring unit (2), a stream server (3) and a client terminal (5). The authoring unit generates a file composed of encrypted contents data and the ancillary information at least containing the packetizing control information for generating an RTP packet, a non-encrypted codec dependent header made up of the information pertinent to encoded contents data, and the encryption information for decrypting the encrypted contents data form packet to packet. The streaming server packetizes the encrypted contents data along with at least the codec dependent header and distributes the resulting data as a stream. The client terminal refers to the codec dependent header of the received packet, re-assembles the packet, and decrypts the encrypted contents data of the re-assembled packet to generate contents data.

16 Claims, 9 Drawing Sheets

(51) Int. Cl.
   *H04N 7/167*      (2011.01)
   *H04N 21/2347*    (2011.01)
   *H04N 21/235*     (2011.01)
   *H04N 21/435*     (2011.01)
   *H04N 21/4405*    (2011.01)
   *H04N 21/6437*    (2011.01)

(52) U.S. Cl.
   CPC ........ *H04N 21/235* (2013.01); *H04N 21/2347* (2013.01); *H04N 21/435* (2013.01); *H04N 21/4405* (2013.01); *H04N 21/6437* (2013.01); *H04L 63/12* (2013.01); *H04L 63/164* (2013.01); *H04L 2209/60* (2013.01)

(56)                References Cited

U.S. PATENT DOCUMENTS

| | | | |
|---|---|---|---|
| 7,136,485 B2 * | 11/2006 | Wee et al. | 380/37 |
| 7,260,721 B2 | 8/2007 | Tanaka et al. | |
| 7,324,648 B1 | 1/2008 | Deaver et al. | |
| 7,337,320 B2 | 2/2008 | Tada et al. | |
| 7,383,435 B2 * | 6/2008 | Fellerer | 713/160 |
| 7,519,811 B1 * | 4/2009 | Hara | 713/151 |
| 2002/0047899 A1 | 4/2002 | Son et al. | |
| 2002/0064273 A1 | 5/2002 | Tomikawa et al. | |
| 2002/0124097 A1 | 9/2002 | Isely et al. | |
| 2002/0141585 A1 * | 10/2002 | Carr | 380/255 |
| 2003/0012149 A1 * | 1/2003 | Maggenti et al. | 370/260 |
| 2003/0012376 A1 * | 1/2003 | Wee et al. | 380/200 |
| 2003/0051256 A1 | 3/2003 | Uesaki et al. | |
| 2003/0200548 A1 | 10/2003 | Baran et al. | |
| 2004/0008739 A1 | 1/2004 | Aoki | |
| 2004/0019642 A1 | 1/2004 | Jinzaki | |
| 2004/0156508 A1 * | 8/2004 | Tada et al. | 380/281 |
| 2004/0202323 A1 * | 10/2004 | Fellerer | 380/44 |

FOREIGN PATENT DOCUMENTS

| | | |
|---|---|---|
| JP | 2002-111625 | 4/2002 |
| WO | 00/59150 | 10/2000 |

OTHER PUBLICATIONS

Baugher McGrew et al., The Secure Real Time Transport Protocol <draft-ietf-avt-srtp-03.txt>, Internet Engineering Task Force, AVT Working Group, Internet-Draft [online], Feb. 2002, [retrieved on Feb. 10, 2004], Retrieved from the Internet:<URL:http://web.archive.org/web/20020312051959/www.ietf/org./internet-drafts-ietf-avt-srtp-03.txt>, especially 3.SRTP Framework.

Katsutoshi Ando, et al; "Cryptography considering Transmission Error for JPEG2000 Images", IEEE International Conference on Image Processing, vol. I of III, Oct. 7-10, 2001, p. 67 (w/English Abstract).

Susie J. Wee, et al. "Secure Scalable Video Streaming for Wireless Networks" IEEE International Conference on Acoustics, Speech and Signal Processing, XP-002235689, May 2001, 4 pages.

Jian Lu. "Signal Processing for Internet Video Streaming: A Review" In Image and Video Communication and Processing 2000, Proceedings of SPIE vol. 3974, XP-002463327, Jan. 28, 2000, pp. 246-259.

Wee et al. "Secure Scalable Video Streaming for Wireless Networks", IEEE International Conference on Acoustics, Speech and Signal Processing, XP-002235689, May 2001, 4 pages.

Combined Chinese Office Action and Search Report issued Jan. 6, 2014 in Patent Application No. 201210063164.X (with English language translation).

* cited by examiner

RELATED ART

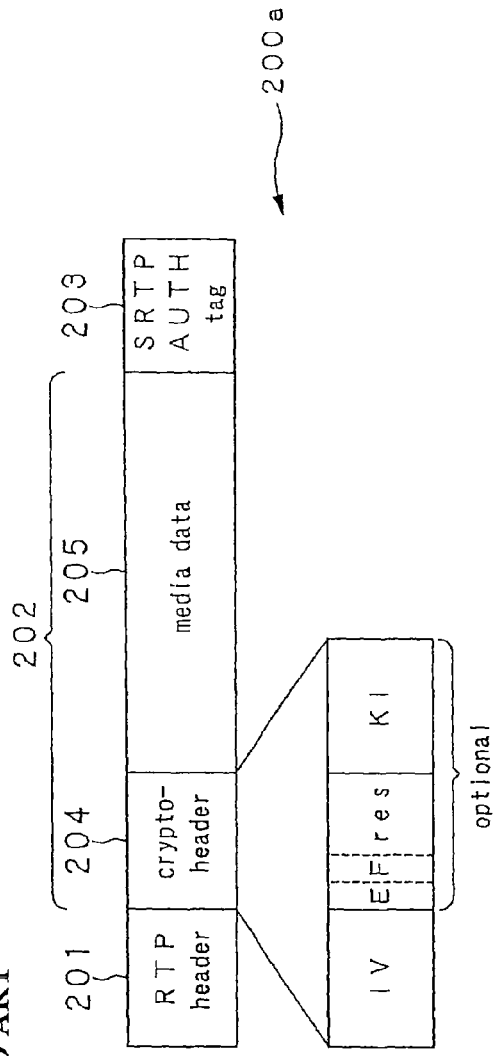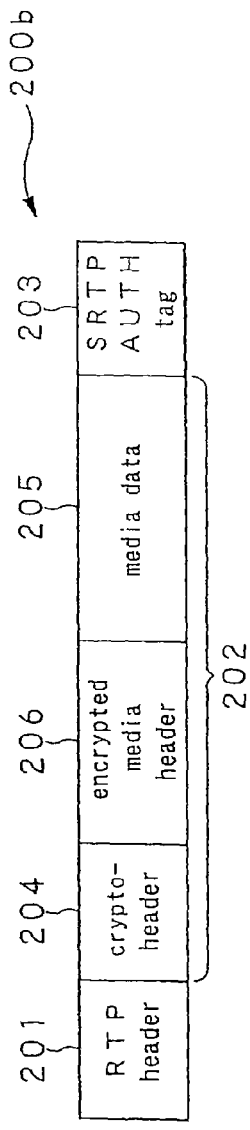

RELATED ART

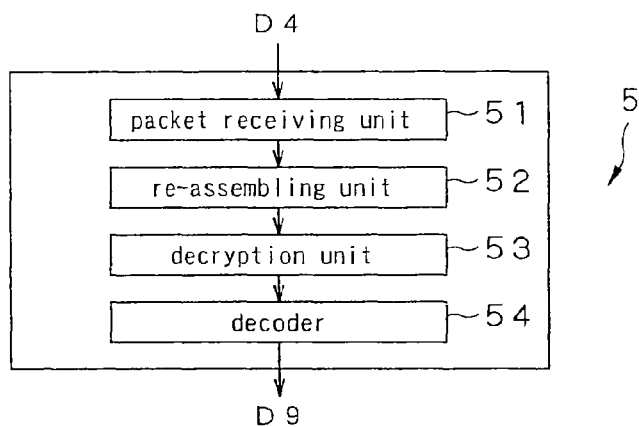
FIG.11
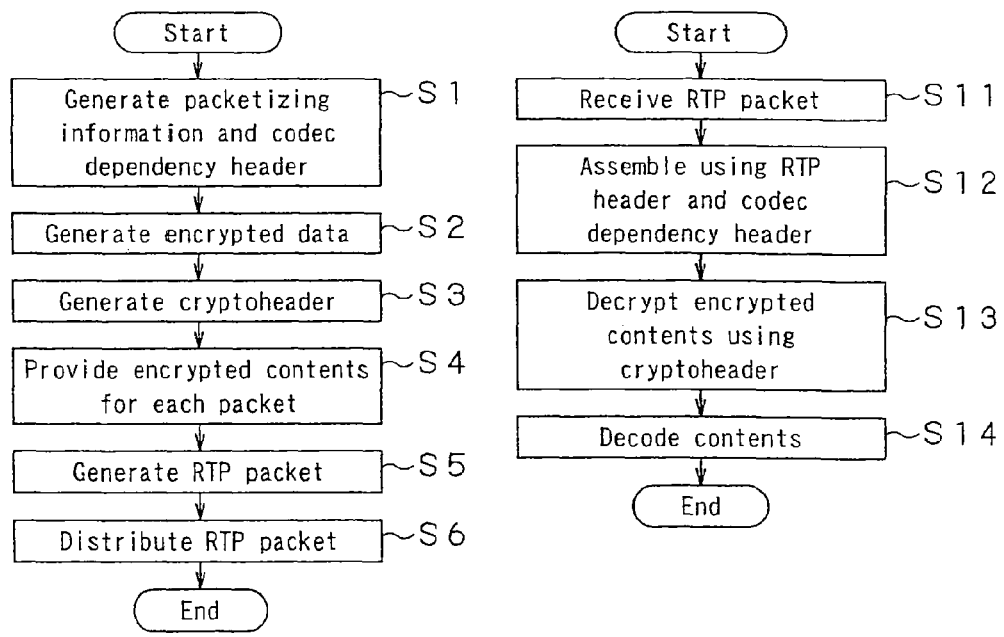
FIG.12A
FIG.12B

US 9,088,548 B2

STREAMING SYSTEM AND METHOD

CROSS-REFERENCE TO RELATED APPLICATIONS

This application is a continuation Application of, and claims the benefit of priority under 35 U.S.C. §120 from, U.S. application Ser. No. 13/243,694, filed Sep. 23, 2011, which is a continuation application of U.S. application Ser. No. 10/498,815, filed Jun. 22, 2004, which is a National Stage Application of International Application No. PCT/JP03/13867, filed Oct. 29, 2003, which claims the benefit of priority under 35 U.S.C. §119 from Japanese Patent Application No. 2002-320465, filed in Japan on Nov. 1, 2002. The entire contents of each of the above applications are incorporated herein by reference.

TECHNICAL FIELD

This invention relates to a streaming system and a streaming method in which encoded speech data or picture data is encrypted and distributed as a stream, a streaming server, a data distributing method, a client terminal, a data decoding method, an authoring device, an authoring method, and to a program.

BACKGROUND ART

In present days, the transmission of speech data and/or picture data, collectively referred to as contents data, over the Internet, is made in accordance with a downloading transmission system, or a streaming transmission system, sometimes abbreviated herein to streaming. In the downloading transmission system, a contents data file, transmitted from the distributing server, is transiently copied by a client terminal (device) and subsequently the contents data, such as pictures, of the contents data file, are reproduced. Hence, with the downloading transmission system, data cannot be reproduced on a terminal side until the file transmission comes to a close, such that this downloading transmission system is not convenient for reproducing e.g. picture data for prolonged time.

On the other hand, with streaming, the client terminal sequentially reproduces digital signals in real-time as the terminal receives a continuous stream of the digital signals. That is, the data received by the client terminal is reproduced even during the time the digital signals are being transmitted from a stream server to the client terminal. This streaming predominantly uses a protocol termed RTP (Real-Time Transport Protocol), which is real-time transmission protocol prescribed in RFC 1889 of IETF (International Engineering Task Force).

The streaming system ordinarily comprises an authoring device, a stream server and a client terminal. The authoring device is supplied with encrypted contents data, obtained by encoding contents data supplied from picture inputting means, such as a camera or a VTR (video tape recorder), and which has been encrypted by a so-called contents data key. The authoring device then formulates, from the encrypted contents data, the data for stream distribution, as prescribed by the distribution system. The data for stream distribution is composed of, for example, the encrypted contents data, added by the header information usable for adding a header stating the information pertinent to the entire contents data, and a track for each data sort, to the contents data, and by the ancillary information, including a session describing protocol (SDP) file, prepared in accordance with the session description protocol SDP (RFC237), and the packetizing control information. The data for stream distribution, thus prepared, is recorded on e.g. a recording unit of a recording medium, such as an optical disc, owned by the authoring device. If a request is made from the client terminal for employing the contents data, this stream distribution data is optionally taken out from the recording unit and sent to the streaming server, from which the session description protocol (SDP) file is transmitted to the client terminal. The client terminal then acquires, from the session description protocol (SDP) file, the information needed for receiving the stream, such as an address, a port number or a packet format. The streaming server then packetizes the data for stream distribution, in accordance with the packetizing control information, and distributes the data (stream), from packet to packet, to a client terminal, such as personal computer (PC), for real-time reproduction, in accordance with RTP and RTSP (Real-Time Streaming Protocol).

In connection with this stream distribution, there exist a large variety of the distribution systems used, stream compression systems and transmission protocols. Hence, the International Streaming Media Alliance, abbreviated herein to ISMA, prescribing the open standard for stream distribution over the Internet of rich media (video, audio and relevant data), has been organized, and the procedure for adopting the open standard is now underway. An example of the open standard is hereinafter explained.

FIG. 1 depicts an example of a conventional streaming system. Referring to FIG. 1, contents data are packetized and distributed as a stream from a server 101 to a client terminal 102. The ISMA is an organization which prescribes the open standard for e.g. the code compression system or the packetizing system of the stream data at this time. For example, it is prescribed that the RTSP protocol, provided for by the IETF, shall be used for session management, and that the RTP protocol, provided for by the IETF, shall be used for media transmission (stream distribution). The open standard for encryption and packetizing is also prescribed.

For distribution of the picture or the voice as digital data by such system, copyright protection is crucial. The digital data is not deteriorated by duplication, so that, if the copied data is such as may be directly viewed or heard, a large quantity of copies may be produced, thus detracting from the commercial value of the contents data. Consequently, the general practice is to take protective measures for the digital picture and speech data by e.g. encryption, in accordance with the digital copyright management or digital right management (DRM) system, such that, even if data can be copied, data reproduction is not possible in the absence of a decoding key designed for decoding the encrypted data.

FIG. 2 depicts a block diagram showing a streaming system for illustrating the conventional DRM. The streaming system is configured as shown for example in FIG. 7. That is, the streaming system includes a provider 111 for providing contents data D11, such as picture data and/or speech data, an authoring (master) 112 for encrypting the contents data D11 for formulating encrypted contents data, and for generating the ancillary information, such as the packetizing control information, for managing control for generating a packet of a preset format, and a streaming server 113 for receiving data D12, inclusive of the encrypted contents data from the authoring 112, and the ancillary information, inclusive of the packetizing control information, packetizing the encrypted contents data based on the packetizing control information in accordance with the packetizing control information, and for distributing the data as stream data D15. The streaming system also includes a license management server 114 supplied from the provider 111 with data D13 pertinent to the rights of the contents data D11 to perform copyright management of the contents data D11, and a client terminal 115 which, when supplied with license D14, such as viewing rights or use conditions and with a cipher key pertaining to the contents data D11, from the license management server 114, is able to view the received stream data D15.

By allowing only the licensed client terminal 115 to decrypt the encoded stream data into the plaintext, it is possible to protect the rights of the provider as a contents data furnishing party.

The RTP packet in case of distributing the stream data using the RTP protocol is hereinafter explained. The RFC 3016 provides that video or audio data of a preset unit shall be transmitted as one RTP packet. FIGS. 3A and 3B are schematic views showing an illustrative structure of the RTP packet. Referring to FIG. 3A, a packet 200a, distributed as a stream, is made up by an RTP header 201 and an RTP payload 202, and may also include a tag 203, in case of employing an SRTP protocol.

The RTP payload 202 includes media data (contents data) 205, in which to hold one or more video packet, and a cryptoheader (encrypted header) 204. In the cryptoheader 204, the encryption information, such as the encryption system, is written as 'IV', representing the information pertinent to the encrypted media data 205. The information 'E' indicating whether or not the data in question has been encrypted, the information 'F' as to whether or not the cryptoheader 204 is followed by another cryptoheader, or a key index (KI), may also be stated as optional data. An encrypted media header 206 may also be provided, along with the cryptoheader 204, in the RTP payload 202, as in a packet 200b shown in FIG. 3B. The media data 205 includes a plural number of data units, in each of which an audio frame, for example, is written in case the data is audio data and one-frame data, for example, is written in case the data is a moving picture. In the encrypted media header 206, there is written the information indicating the sequence of the data units in the media data 205, specifically, the serial number in the entire media data.

The media data is initially encrypted and subsequently packetized. The cryptoheader 204, shown in FIG. 3A, and the cryptoheader 204 as well as the encrypted media header 206, shown in FIG. 3B, depend solely on the encryption system, without dependency upon the encoding system. These headers are appended to the encrypted media data 205 as unencrypted plaintext.

In such streaming technique, the encryption method, aimed at high-speed safe encryption, is stated in the Japanese Patent Application Laid-Open No. 2002-111625. In this technique, shown in the Japanese Patent Application Laid-Open No. 2002-111625, an encrypted non-open key is inserted in a stream header of a stream, composed of the stream header and a packet, and the packet, only a data portion of which has been encrypted, is sent to a client by a packet key generated by the non-open key. An open key is handed to the client, who extracts the non-open key by the open key and also generates a packet key by the non-open key to decode the encrypted key from the packet key.

In the above-described system, in which the media data (contents data) is encrypted and subsequently packetized, the media data is already encrypted when the data is to be packetized, so that the information on the encoding system for the media data cannot be obtained. That is, in a streaming server in which data is simply packetized, based on the packetizing control information, it is not clear whether the media data is speech data or video (picture) data or which is the encoding system used, and hence it is difficult to perform the processing peculiar to the encoding system. For example, there are occasions where, depending on the particular encoding system used, there exist data which is crucial and data which is not crucial. However, in such case, the crucial data cannot be distributed a plural number of times to effect reliable distribution of the contents data for taking so-called error resilience into account. On the other hand, the RFC provides for addition of the information dependent on the encoding system (codec dependent header). Thus, with a client terminal designed to receive a packet not added by the codec dependent header provided for in RFC, that is, a packet of the type different from data formed in accordance with the RFC standard, the standard has to be expanded in order to cope with the particular packet.

It may be envisaged to packetize data before encryption in order to allow the processing peculiar to the encoding system. FIG. 4 schematically shows the structure of a packet in which media data not as yet encrypted is packetized. If the media data is packetized and then encrypted, the media data is packetized, the codec dependent header, dependent on the encoding of the media data, is then added to the packetized media data. The codec dependent header and the media data, both packetized, are encrypted, and a cryptoheader is added to the resulting data.

That is, referring to FIG. 4, a UDP payload 210 is made up by an RTP header 211, an RTP payload 212 and a tag 213 appended as necessary. The RTP payload 212 is made up by a cryptoheader 214, a codec dependent header (codec dependency header) 217 and media data 215. The RTP header 211 and the cryptoheader 214, are non-encrypted plaintext, as aforesaid, while the codec dependent header 217 and the media data 215 are already encrypted.

However, if the media data is first packetized and subsequently encrypted, the following inconvenience arises, even though the codec dependent header can be appended. That is, the streaming server usually distributes data in a packetized form, and not has the rights to view the media data (contents data). Thus, if the non-encrypted media data or the packetized non-encrypted media data is supplied to the streaming server, which streaming server then performs processing, such as encryption, the non-encrypted data is exposed to the streaming server in a manner not desirable from the perspective of DMA.

Additionally, the client terminal has to perform the processing of decryption, reassembling and decoding of the received packet. FIG. 5 schematically shows the processing sequence at the client terminal which has received the packet shown in FIG. 4.

Referring to FIG. 5, the client terminal first decrypts the encrypted codec dependent data and the encrypted media data, in a decryptor 501, and links the media data together in a re-assembler 502 in an original sequence prior to packetizing. The media data may then be viewed by decoding the encoded media data to the original media data by e.g. a decoder 503.

Since the client terminal in this case decrypts the encrypted contents data immediately after receiving a packet, the client terminal handles non-encrypted data since the time the client terminal re-assembles and decodes the data until the time it is viewed. Hence, the contents data may illicitly be acquired by e.g. cracking the processing modules, thus lowering tamper-proofness. If the processing modules are rendered tamper-proof, in their entirety, the result is the increased cost.

DISCLOSURE OF THE INVENTION

In view of the above-depicted status of the art, it is an object of the present invention to provide a streaming system, a streaming method, a streaming server, a data distribution method, a client terminal, a data decoding method, an authoring device, an authoring method, and a program, in which safety of a contents data receiving party may be improved as the copyright of the contents data provider is protected.

A streaming system according to the present invention includes stream distribution means for packetizing encrypted contents data, obtained on encrypting contents data, in turn obtained on encoding picture data and/or speech data, along with at least the non-encrypted encoding information specifying the information pertinent to encoding of the contents data, and distributing the resulting data as a stream, and stream receiving means for receiving the packet from the stream distribution means, depacketizing the received packet based on the non-encrypted encoding information and decrypting the encrypted contents data of the depacketized packet to generate the contents data.

According to the present invention, since the encoding information is not encrypted, re-packetizing may be made without decrypting the encrypted contents data. The receiving side is able to decrypt the received data on the downstream side of the re-assembling step for the received packet. Moreover, since only the contents data need to be decrypted, the same encrypted contents data may be used e.g. for local processing, such as reproduction.

An authoring device according to the present invention comprises ancillary information generating means for generating the ancillary information composed of the non-encrypted encoding information specifying the information pertinent to encoding of contents data obtained on encoding the picture data and/or the speech data, and the packetizing control information for managing control for forming a packet of a preset format, and encrypted contents data generating means for generating encrypted contents data, obtained on encrypting the contents data.

A streaming server according to the present invention comprises packetizing means for packetizing encrypted contents data, obtained on encrypting contents data, in turn obtained on encoding picture data and/or speech data, along with at least the non-encrypted encoding information, specifying the information pertinent to encoding of the contents data, and data distributing means for distributing the packet as a stream.

According to the present invention, re-packetizing may be made without decrypting the encrypted contents data. Moreover, since only the contents data need to be encrypted, the same encrypted contents data may be used e.g. for local processing, such as reproduction.

A client terminal according to the present invention comprises receiving means for receiving a packet formed by packetizing encrypted contents data, obtained on encrypting contents data, in turn obtained on encoding picture data and/or speech data, along with the non-encrypted encoding information, specifying the information pertinent to encoding, re-assembling means for re-assembling the packet based on the non-encrypted encoding information contained in the received packet, and decrypting means for decrypting the encrypted contents data of the re-assembled packet.

According to the present invention, the processing of decrypting the received data may be carried out on the downstream side of the re-assembling processing for the received packet, and only the downstream side of the decrypting means is to be tamper-proofed, thus reducing the production cost of the system.

The program according to the present invention allows a computer to execute the aforementioned authoring, data distribution or data decryption.

BRIEF DESCRIPTION OF THE DRAWINGS

FIGS. 3A and 3B are schematic views showing an illustrative structure of an RTP packet.

FIG. 11 is a schematic block diagram showing processing modules in a client terminal according to the present invention.

FIG. 12A is a flowchart showing a stream data distributing method on the stream distributing side according to the present invention and FIG. 12B is a flowchart showing a stream data receiving method on the stream data receiving side according to the present invention.

BEST MODE FOR CARRYING OUT THE INVENTION

Figure 1:
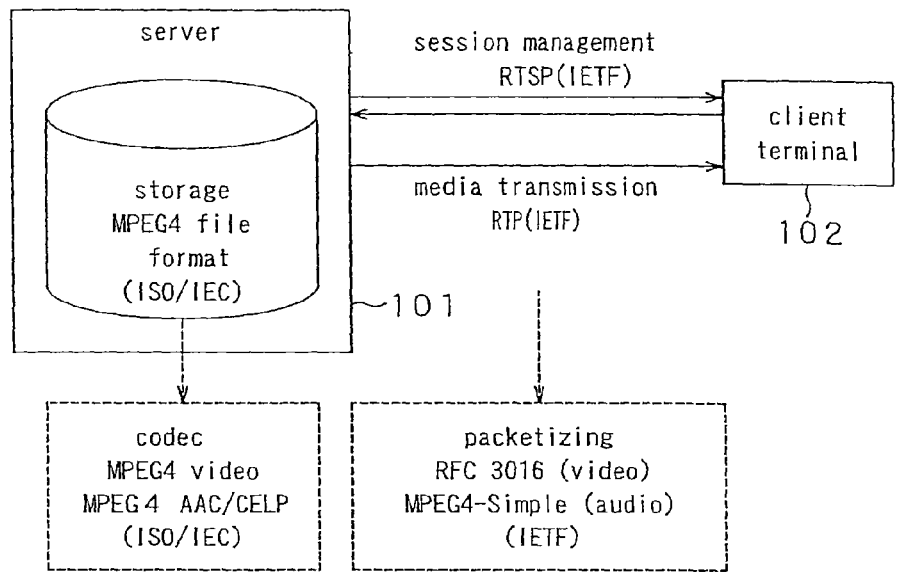
FIG. 1 is a block diagram showing an example of a conventional streaming system.
Figure 2:
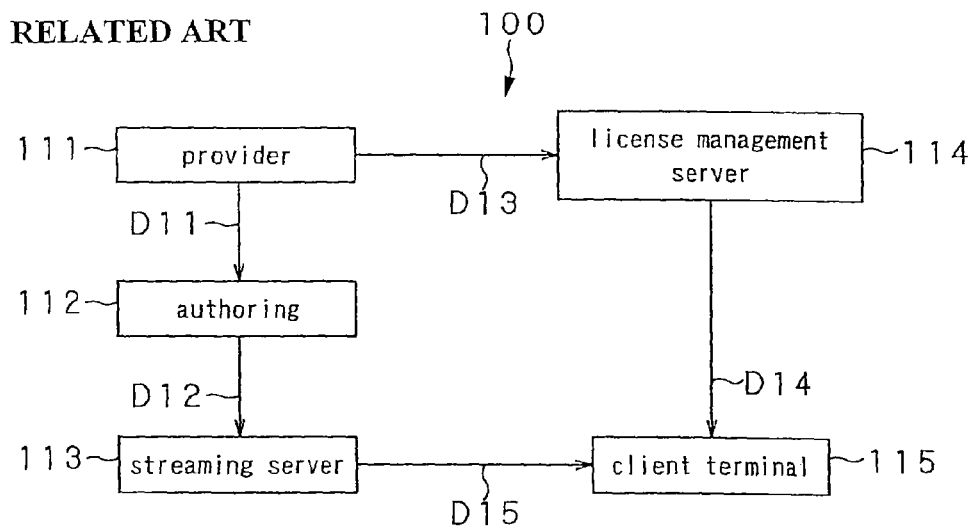
FIG. 2 is a block diagram showing a streaming system for illustrating the conventional DRM.

Referring to the drawings, concrete preferred embodiments of the present invention are explained in detail. In these embodiments, the present invention is applied to a streaming system in which contents data comprising picture data and/or speech data, encoded for compression in accordance with a preset system, such as MPEG4 (Moving Picture Experts Group 4), are encrypted and distributed in real-time to the client terminal. In the following, RTP is used as the transmission protocol. However, this is merely illustrative and is not intended for limiting the scope of the invention.

Figure 6:
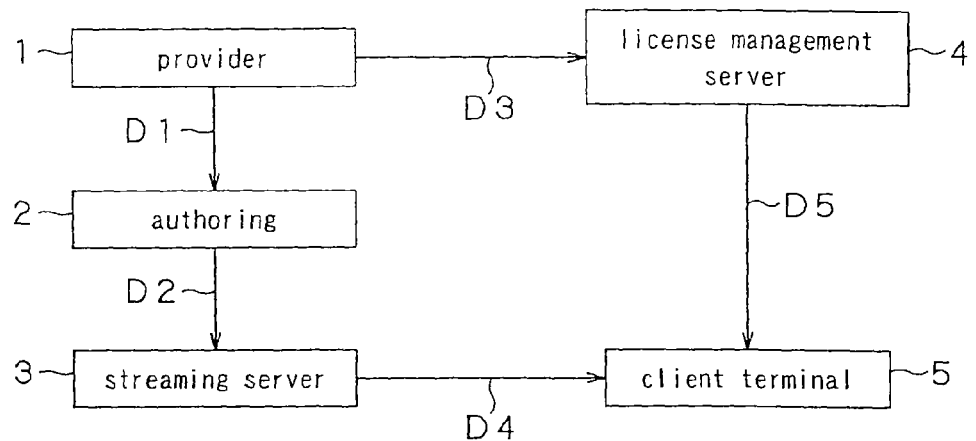
FIG. 6 is a block diagram showing a streaming system according to the present invention.

FIG. 6 is a block diagram showing a streaming system according to the present invention. In FIG. 6, the streaming system, according to the present invention, is made up by a stream distributing side and a stream receiving side. The stream distributing side includes a provider 1, as a party furnishing contents data D1, which is contents data, obtained on encoding contents data, such as picture data and speech data, in accordance with a preset system, such as MPEG4, and an authoring unit 2 for generating the packetizing control information of a preset form, that is, an RTP packet, and a codec dependent header, indicating the information for encoding the contents data D1, from the contents data D1, to encrypt only the contents data D1, and for generating a cryptoheader for decrypting the encrypted contents data D1, on the packet basis, as reference is made to the packetizing control information and to the codec dependent header. The stream distributing side also includes a streaming server 3 for converting the encrypted contents data D1 into packetized encrypted contents data, stored in each packet, based on the packetizing control information, and for generating and distributing an RTP packet composed of the packetized encrypted contents data, combined with the RTP header, cryptoheader and the codec dependent header, and a license management server 4 supervising the copyright of the contents data D1 owned by the provider 1.

That is, the provider 1 sends the contents data D1, which are the picture data and/or the speech data, to the authoring unit 2, while sending rights data D3, as the copyright data, to a license management server 4. The authoring unit 2 sends, as the data D3, encrypted media data, obtained on encrypting the contents data D1, packetizing information, codec dependent header, RTP header and the cryptoheader, as a stream to the streaming server 3.

The stream receiving side is a terminal 5, such as a PC, owned by the user (client) viewing the contents data D1 (referred to below as a client terminal). This client terminal 5 receives a packet from the streaming server 3, while receiving the license of the contents data D1 from the license management server 4. Hence, the user is able to view the contents data D1. That is, the client terminal 5 receives stream data D4 from the streaming server 3, while receiving data D5, such as the cipher key, rights to view the contents or contents use conditions from the license management server 4.

An embodiment of the present invention is now explained in detail. As explained in connection with the conventional technology, in streaming transmission of the encrypted contents data in the contents data distribution over a network, the transmission data (referred to below as a packet) in general is made up by a transmission protocol header, as the transmission information representing the information pertinent to the encoding, a cryptoheader, as the encryption information representing the information for decrypting the encrypted contents data, a codec dependent header, as the encoding information specifying the information pertinent to the encoding, and contents data. In the present embodiment, the RTP is used as the transmission protocol, so that the packet is an RTP packet and the transmission protocol header is the RTP header, while the codec dependent header is what may be termed an RTP payload header. The QuickTime (registered trademark) by APPLE Inc., for example, may be used as the streaming technique for distributing this RTP packet.

Figure 7:
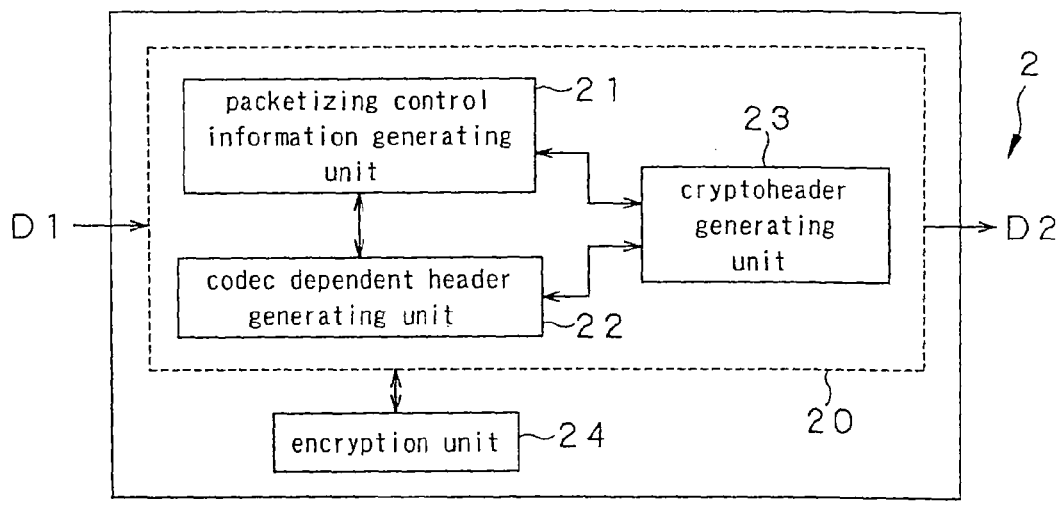
FIG. 7 is a schematic block diagram showing processing modules in an authoring unit according to the present invention.

The authoring unit 2, shown in FIG. 6, is supplied with the contents data D1 from the provider 1. The respective functions (processing operations) of the authoring unit 2, explained below, may be implemented by the software. FIG. 7 depicts a schematic block diagram showing processing modules in the authoring unit 2. This authoring unit 2 is made up by a subsidiary information generating unit 20 for generating the subsidiary information, at least including the encoding information, specifying the information pertinent to the encoding system of the contents data D1 and the packetizing control information, and an encryption unit 24 for encrypting the contents data without changing the data length of the contents data D1.

The subsidiary information generating unit 20 includes a packetizing control information generating unit 21 for packetizing the contents data D1, a codec dependent header generating unit 22 for generating a codec dependent header, and a cryptoheader generating unit 23 for decrypting the contents data D1, from packet to packet, based on the packetizing control information and the codec dependent data.

The packetizing control information generating unit 21 generates the packetizing control information for packetizing the contents data (media data) D1 for distributing the so packetized contents data. The packetizing control information is used for generating a packet of a preset format, prescribed by the streaming system, and is specifically the information specifying which portion of the contents data is to be stored in which RTP packet. The RTP packet in the present embodiment (UDP payload) is of the format shown in FIG. 8. That is, an RTP packet 60 is made up by an RTP header 61, an RTP payload 62 and a tag 63, appended as necessary (SRTP AUTHTAG) 63. The RTP payload 62 is made up by a cryptoheader 64, a codec dependent header 65(codec dependency header) 65 and a media data 66 in which to store the encrypted contents data. The packetizing control information generating unit 21 generates the packetizing control information so that the packetizing control information will be of the format shown in FIG. 8. Meanwhile, the tag 63 is appended in employing an SRTP as a transmission protocol, as an example. In this tag is written the information pertinent to the authentication.

The codec dependent header generating unit 22 generates the codec dependent header 65, as the information appended in order to cope with the split transmission of the contents data and the transmission loss. This codec dependent header 65 depends on the contents which differ from codec to codec, that is, upon the particular codec system used. The information contained in the codec dependent header 65 is e.g. the information necessary for decoding the contents data in the RTP packet which is only a fraction of the entire contents data and the information for raising the resistance against packet loss that may occur in transmission.

The encryption unit 24 encrypts the contents data D1 in accordance with an encryption system not changing the data length (code length), such as a counter mode, to generate encrypted contents data. According to the present invention, tamper-proofness may be improved by encoding only the contents data D1 without encrypting the codec dependent header.

After generating the encrypted contents data by the encryption unit 24, the cryptoheader generating unit 23 references the packetizing control information and the codec dependent header 65 to generate the cryptoheader 64 to be appended from one RTP packet to another. The cryptoheader 64 is made up by the information which makes it possible to decrypt the encrypted contents data on the packet basis.

Figure 9:
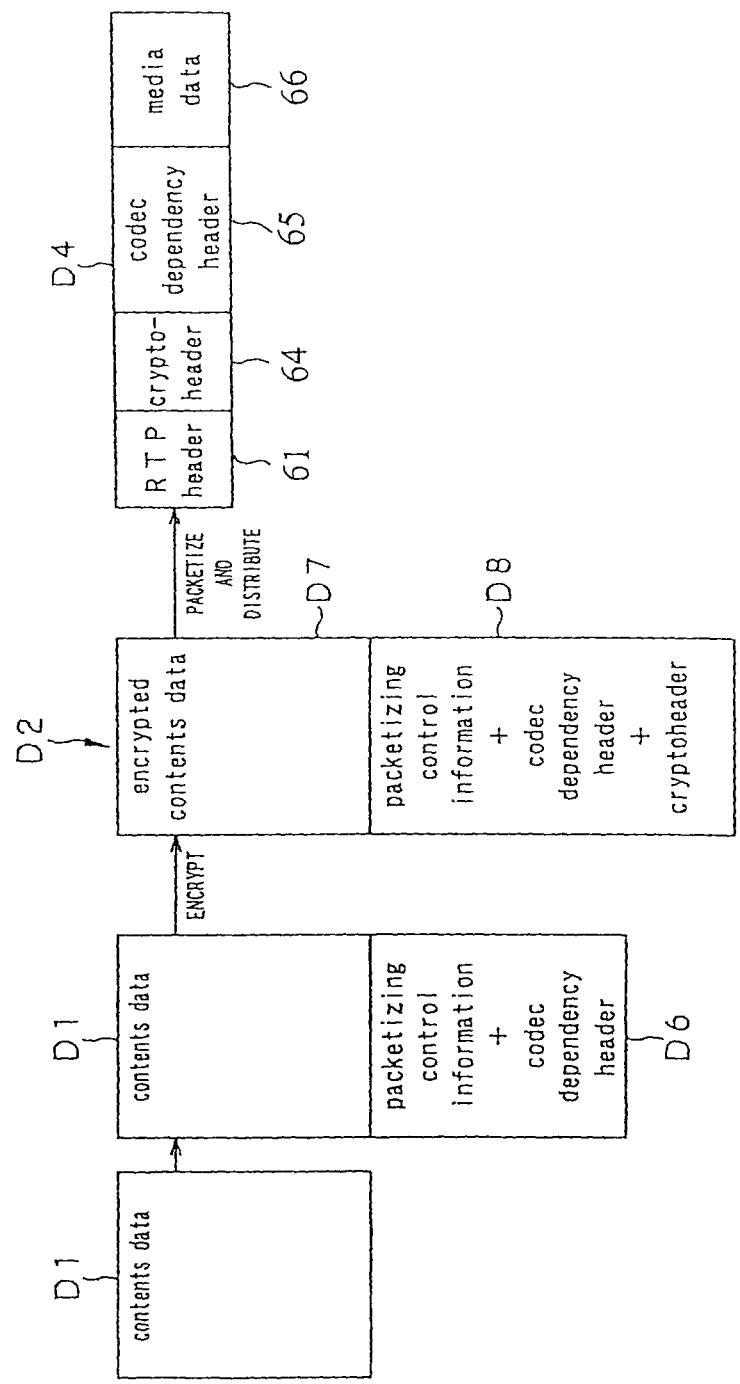
FIG. 9 is a schematic view showing the data structure of the stream distributing side according to the present invention.

FIG. 9 schematically shows a data structure on the stream distribution side. First, in the authoring unit 2, the ancillary information D6, including the packetizing control information and the codec dependent header, is generated, and the contents data D1 is then encrypted in the encryption unit 24 to generate encrypted contents data D7. When the cryptoheader is generated by the cryptoheader generating unit 23, file data D2, obtained on appending the ancillary information D8, formed by appending at least the packetizing control information, codec dependent header and the cryptoheader to the encrypted contents data D7, is sent to the streaming server 3. The ancillary information is termed the Hint Track in the above Quick Time (registered trademark), while the processing of appending the ancillary information to the encrypted contents data is termed the Hinting. The above-described processing is carried out by a unit (processor) which is allowed by a provider owning the picture data and the speech data or which is protected by the copyright. In the present embodiment, the encrypted contents data is supplied to the streaming server 3 as the file data D2, along with the ancillary information, and hence the streaming server 3 does not have to acquire the copyright of the contents data D1. Since the contents data are encrypted, that is, the streaming server 3 is unable to decrypt the encrypted contents data D1, the contents data may be packetized and distributed in the copyright protected state.

Figure 8:
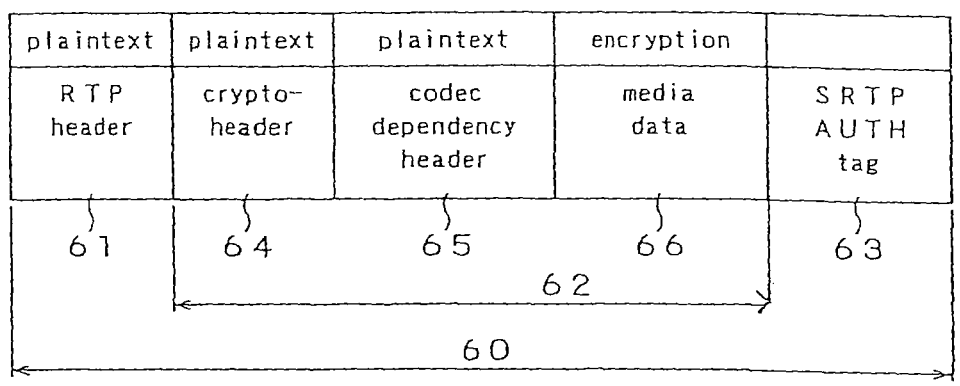
FIG. 8 is a schematic view showing the structure of an RTP packet according to the present invention.
Figure 10A:
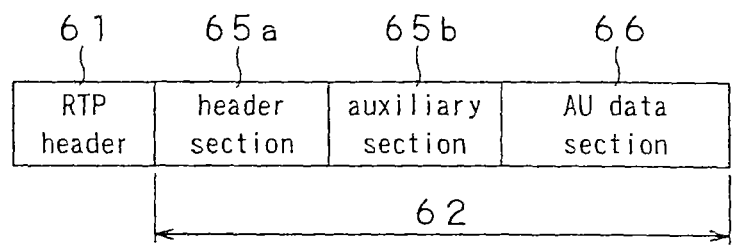
FIGS. 10A to 10C are schematic views showing an illustrative structure of a codec dependent header according to the present invention.
Figure 10B:
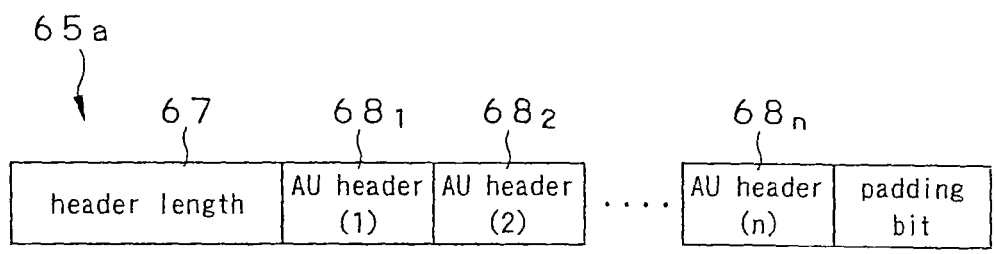
Figure 10C:
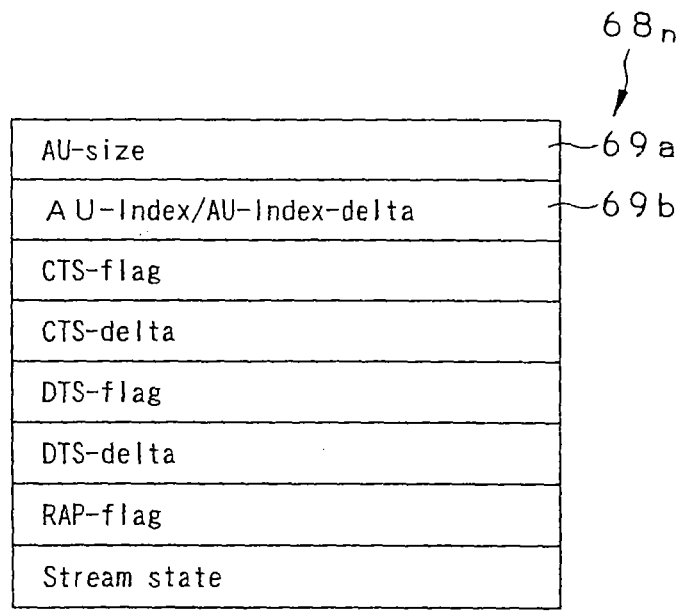

The structure of the codec dependent header in the RTP packet shown in FIG. 8 is now explained in further detail. FIGS. 10A to 10C are schematic views showing an example of the codec dependent header. Referring to FIG. 10A, the codec dependent header, stored in the RTP payload (RTP packet payload) 62, is specifically made up by e.g. an AU (access unit) header section 65a and an auxiliary section 65b. In the present instance, the AU data section corresponds to the media data 66, in which to store the encrypted contents data, as shown in FIG. 8.

Referring to FIG. 10B, the AU header section is made up by an AU header length 67, in which to store the information indicating the length of the entire AU header, an AU header $68_n$, associated with e.g. n AU data (encrypted contents data) stored in each AU data section, and by padding bits. Referring to FIG. 10C, the n AU headers $68_n$ each include e.g. a portion 69a indicating the size of the AU data, and an index portion 69b indicating the sequence of the AU data.

The file data D2, generated in this manner by the authoring unit 2, and composed of the encrypted contents data and the ancillary information, is sent to the streaming server 3. When supplied with the file data D2, the streaming server 3 provides encrypted contents data for storage in each RTP packet, based on the packetizing control information in the ancillary information D8 of the file data D2. That is, the packetized encrypted contents data of a preset data length is generated from the encrypted contents data, for storage in the preset RTP packet, based on the packetizing control information. The packetized encrypted contents data are stored by packet generating means, not shown, in a preset RTP packet, as shown in FIGS. 8 and 9, for generating the RTP packet along with the codec dependent header, cryptoheader and the RTP header. The RTP packet D4 is distributed, responsive to the request by the client terminal 5, by distributing means, not shown.

Meanwhile, it is the provider who owns the copyrights of the contents data and, for example, the license management server 4 manages the copyrights based on the rights data D3 imparted by the provider 1. That is, the provider 1 or the license management server 4 licenses only the client terminal 5 allowed by the provider or the license management server to view the contents data D1. This license includes the cipher key for decrypting the encrypted contents data, the rights to request the contents data from the streaming server who views the contents data, and use rights of the contents data, such as prohibition of the duplication of the contents data. The benefits of the contents data provider may be protected in this manner by the license management server 4 supervising the copyrights of the contents data. In the present embodiment, the license management server 4 manages the copyrights owned by the provider 1. However, the management may be made by no other than the provider 1.

The client terminal 5, as the data receiving side, is now explained. The client terminal 5 receives the stream data D4 from the streaming server 3, while acquiring the license D5 from the license management server 3. The client terminal 5 may acquire the license by making payment of the fee for viewing the contents data to the provider 1. By arranging so that, except if the license is acquired, the encrypted contents data contained in the received packet cannot be decrypted in the client terminal 5, it is possible to improve the safety.

FIG. 11 schematically shows the processing modules in the client terminal. Referring to FIG. 11, the client terminal 5 includes a receiving unit 51 for receiving an RTP packet, a re-assembling unit 52 for re-assembling (de-packetizing) the encrypted contents data of the RTP packet, a decryption unit 53 for decrypting the re-assembled encrypted contents data, and a decoder 54 for decoding the contents data D1 in the plaintext form. The client terminal 5 also includes a communication means with the provider 1 and with the license management server 4, not shown, and is able to acquire the rights to view the contents data via this communication means.

The re-assembling unit 52 references a codec dependent header 65 to perform re-assembling. In the RTP packet in the present embodiment, the codec dependent header 65 is in the form of the plaintext, that is, is not encrypted, as shown in FIG. 8. Thus, the re-assembling unit 52 may reference the codec dependent header 65 in an as-received packet to perform re-assembling. Such re-assembling is possible even in case the encrypted contents data stored in the media data 66 of a given packet are repeatedly transmitted in redundancy or the encrypted contents data is sent in an unordered sequence.

The decryption unit 53 is able to acquire a decryption key for decrypting the encrypted contents data, over the aforementioned communication means, and to refer to the cryptoheader to decrypt the re-assembled encrypted contents data. The decryption unit 53 then delivers the decrypted data to the decoder 54.

The decoder 54 decodes the decrypted contents data to demonstrate the decoded contents data on e.g. a display means, not shown, to permit the contents data to be viewed at the client terminal 5.

The stream data distributing method according to the present invention is hereinafter explained. FIGS. 12A and 12B are flowcharts for illustrating the stream data distributing method on the stream data distributing side and the stream data receiving method on the stream data receiving side, respectively.

Referring to FIG. 12A, the stream data distributing side first generates the packetizing control information for generating an RTP packet to generate a codec dependent header from the contents data D1 (step S1). The stream data distributing side then encrypts the contents data in accordance with an encryption system, in which the data length is not changed, and generates encrypted contents data (step S2). The stream data distributing side then refers to the packetizing control information and to the codec dependent header to generate a cryptoheader for decrypting the encrypted contents data in terms of the RTP packet as a unit (step S3). A file composed of these encrypted contents data, and at least the ancillary information, including the packetizing control information, codec dependent header and the cryptoheader, is sent from the authoring unit to the streaming server 3.

The streaming server 3 refers to the packetizing control information and provides encrypted contents data stored in each packet (step S4). The streaming server 3 synthesizes the RTP header, cryptoheader and the codec dependent header to the encrypted contents data to generate an RTP packet (step S5) to distribute the RTP packet (step S6).

The client terminal side, as the stream receiving side, requests viewing the contents data, from the provider 1 or the license management server 4, as necessary. The streaming server 3 then distributes the RTP packet as a stream to the client terminal. Referring to FIG. 12B, the client terminal side then receives the RTP packet (step S11) and de-packetizes (re-assembles) the received packet, using the RTP header and the codec dependent header (step S12). Since the codec dependent header has as yet not been encrypted, codec-related processing may be made, using the codec dependent header, as in the case of the plaintext contents data (non-encrypted contents data).

Then, using the cryptoheader, the encrypted contents data is decrypted (step S13). This decodes the decrypted contents data (step S14). The so decoded contents data may be used, e.g. viewed.

The favorable effect of the present invention is now explained. From the perspective of DRM, the processing for using the contents data, such as the processing of decryption performed by the decryption unit 53 of the client terminal 5 and the processing of decoding performed by the decoder 54, shown in FIG. 11, entails tamper-proofness on the part of the processing modules, in order to prevent illicit acquisition of the contents data which is made possible by the cracking of the processing modules.

Figure 5:
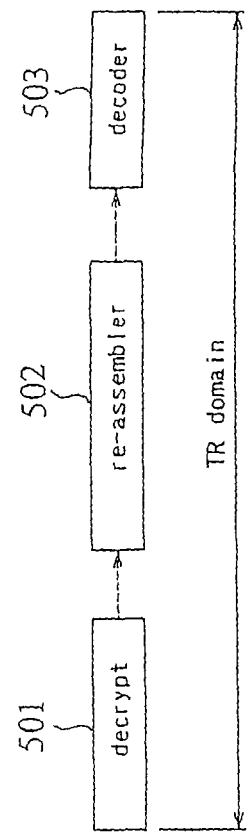
FIG. 5 is a schematic view showing the processing sequence in a client terminal which has received the packet shown in FIG. 4.

However, if the codec dependent header has been encrypted, as in the conventional technique, described above, the processing for the received data in the client terminal 5 necessarily differs from the processing sequence shown in the flowchart of FIG. 12B of the present embodiment, and cannot but be the processing sequence of decryption of the step S13, followed by re-assembling in the step S12, followed in turn by decoding of the step S14. In this case, tamper-proofness is required of the totality of the modules responsible for these three operations, as shown in FIG. 5.

Figure 13:
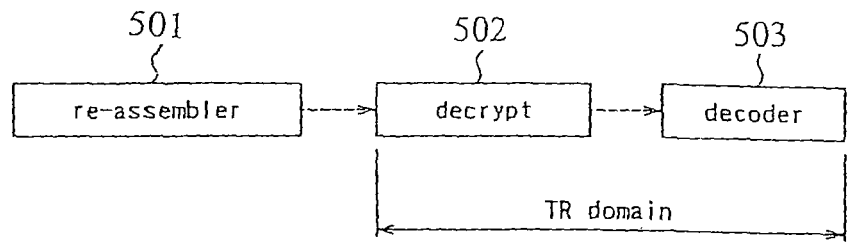
FIG. 13 is a schematic view showing the processing sequence in the client terminal according to the present invention.

According to the present invention, the processing sequence is the re-assembling in the re-assembling unit 52 (step S12), decryption in the decryption unit 53 (step S13) and the decoding in the decoder 54 (step S14), as shown in FIGS. 12B and 13, and hence it is sufficient to render the decryption unit 53 and the decoder 54 tamper-proof.

Figure 14B:
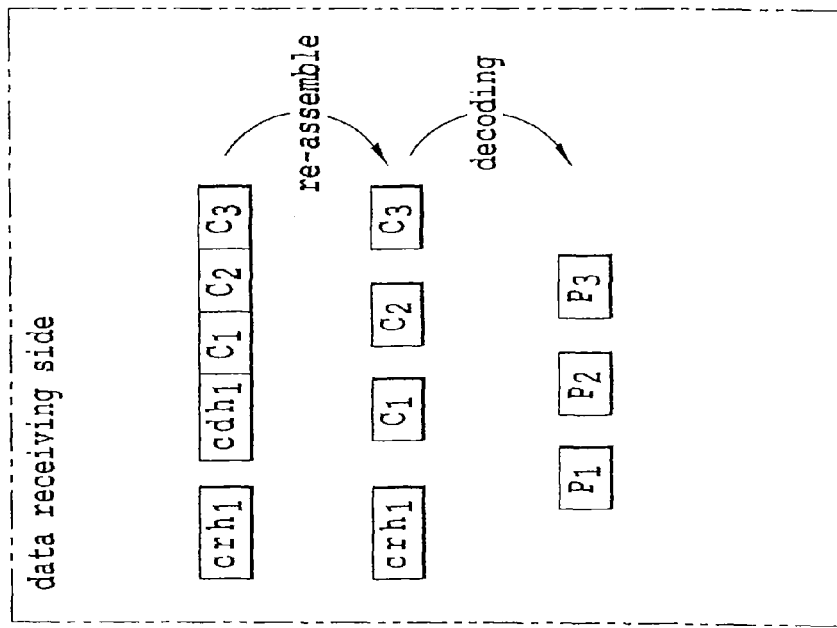
FIGS. 14A and 14B are schematic views for illustrating the data format on the data distributing side and on the data receiving side according to the present invention.
Figure 14A:
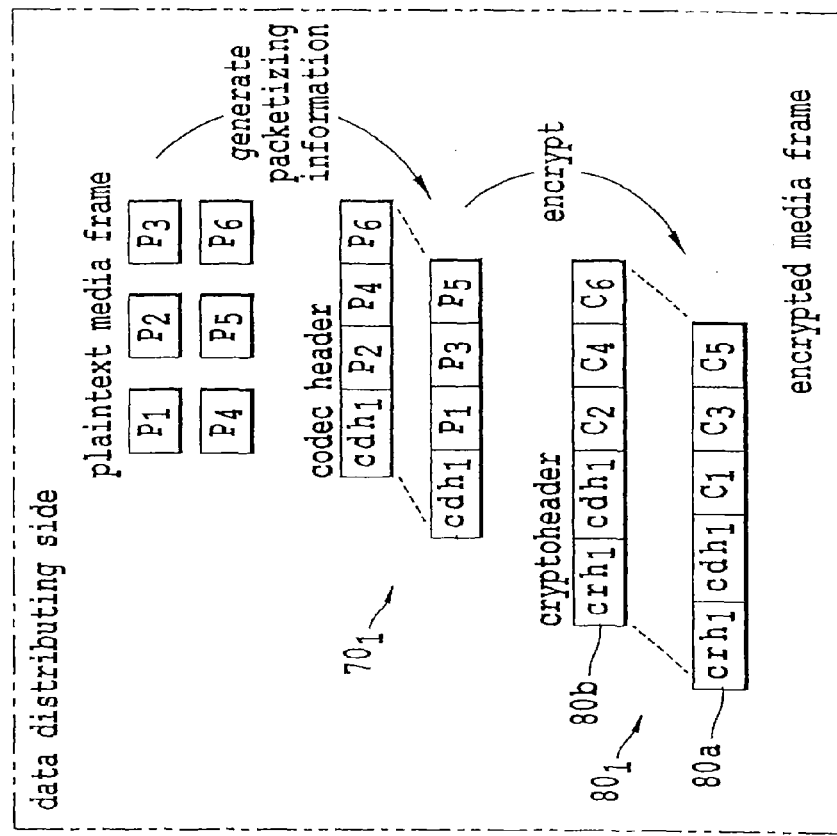

FIGS. 14A and 14B are schematic views for illustrating the data formats on the data distributing side and on the data receiving side of the present embodiment, respectively. Referring to FIG. 14A, if non-encrypted, that is, plaintext, frame-based media data (contents data) $P_1$ to $P_n$ are provided, the data distributing side performs the processing of appending the codec dependent header $cdh_n$ to the contents data by way of generating the packetizing control information. For example, data $70_1$, generated for packetizing, is made up by a codec dependent data $cdh_1$ and media data $P_1$ to $P_3$. The media data $P_n$ in the data $70_n$ is then encrypted to generate encrypted media data $C_n$. To the resulting data is appended a cryptoheader $crh_n$ for packet-based decryption to yield a packet $80_n$. For example, the media data $P_1$ to $P_3$ in the data $70_1$ are encrypted to form encrypted media data $C_1$ to $C_3$, and a cryptoheader $crh_1$ for decrypting the encrypted media data $C_1$ to $C_3$ is appended to the encrypted media data to yield a packet $80_1$. At this time, the cryptoheader $crh_1$ and the codec dependent data $cdh_1$ are not encrypted, that is, is plaintext.

On the other hand, the data receiving side re-assembles the received packet $80_n$, as shown in FIG. 14B. That is, since the codec dependent data $cdh_n$ is the plaintext and hence does not have to be decrypted. Thus, the codec dependent data $cdh_n$ is directly referred to and the encrypted media data $C_n$ stored in the packet $80_n$ is re-assembled. It should be noted that, in the packet $80_1$, the sequence of the encrypted media data $C_1$ to $C_3$, that is, the sequence of the media data $P_1$ to $P_3$, remains the same before and after the re-assembling. However, there are cases where these data cannot be packetized in the order, depending on the codec, due to e.g. the priority of the media data $P_1$ to $P_3$ or to transmission losses of the media data. These cases are those where a packet $80_b$, having stored therein encrypted media data $C_2$, $C_4$, $C_6$, obtained on encrypting the media data $P_2$, $P_4$ and $P_6$, are distributed following a packet $80_a$, having stored therein encrypted media data $C_1$, $C_3$, $C_5$, obtained on encrypting the media data $P_1$, $P_3$ and $P_5$, and where only the encrypted media data $C_1$ are stored in plural packets and distributed repeatedly. The corresponding information is stored in the codec dependent data $cdh_n$. Thus, the codec dependent data $cdh_n$ is directly referred to and the encrypted media data is re-arrayed. The as $crh_n$ is referred to, the re-assembled encrypted media data $C_n$ is decrypted to obtain the media data Pn. That is, in the packet $80_1$, $crh_1$ is referred to and the re-assembled encrypted media data $C_1$ to $C_3$ are decrypted to media data $P_1$ to $P_3$.

Since the codec dependent header is appended before encryption on the data distributing side, the media data may be re-assembled on the data receiving side, as the data remains encrypted, thus improving tamper-proofness, as described above.

On the other hand, the copyright-protected contents data must be encrypted by the copyright owner and decrypted for use solely by those having authorized rights to use the contents. In streaming, the optimum packetizing method for transmitted contents data depends on the conditions of the transmission path. For carrying out the processing seasoned with the contents, such as re-packetizing, non-encrypted contents data need to be accessible. For example, there are occasions where the re-packetizing processing of collecting plural packets into one needs to be carried out, depending on the transmission conditions, such as the error rate of the transmission route.

However, if the codec dependent header has been encrypted, as conventionally, a streaming server outside the scope of the copyright owner is unable to decrypt the encrypted data, or does not have the right to decrypt the data, so that the streaming server is unable to re-assemble the media data, depending on the conditions of the streaming transmission path, to change the codec dependent header. If the codec dependent header has not been encrypted, as in the present invention, the media data may be re-assembled by exploiting the non-encrypted, that is, plaintext, codec dependent header, without decrypting the encrypted contents data and employing the so decrypted data.

Figure 4:
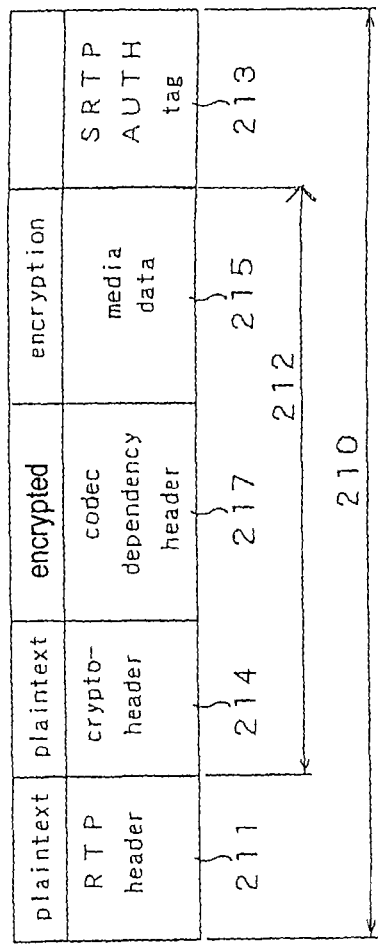
FIG. 4 is a schematic view showing the structure of a packet formed prior to encryption.

If, as shown in FIGS. 4 and 5, not only the contents data but also the codec dependent header is the subject of encryption, packet-based decryption needs to be feasible. Hence, encrypted contents data and the codec dependent header are alternately contained in a sequence of the encrypted data. The encrypted contents data are distributed in a stream and reproduced. In case local use of the encrypted contents data is desired, such as when the encrypted contents data is to be distributed as a stream and reproduced, or the encrypted contents data is to be downloaded and reproduced, without streaming, the codec dependent data, other than the encrypted contents data, needs to be decrypted, depending on the particular encryption system used, in order to decrypt the needed contents data, or in order to identify the desired encrypted contents data portion in case only the desired encrypted contents data portion is to be decrypted. Moreover, the contents data and the codec dependent header cannot be separated from the decrypted data, except if the information therefor is made available.

On the other hand, if the codec dependent header is not the subject of the encryption, as in the present invention, the encrypted data is composed only of the contents data, such that the same encrypted contents data may be put to both the local use and the use for streaming.

Heretofore, the codec dependent header was encrypted, so that de-packetizing (re-assembling) may be carried out only on the downstream side of the decryption. However, the de-packetizing and decryption are inherently distinct from each other, so that, if the codec dependent header is not encrypted, there is no constraint on the processing order of the de-packetizing and decryption. Thus, the present embodiment, in which the ancillary information attendant on the packetizing of the transmitted contents data is not encrypted in the streaming of the encrypted contents data, has the following merits:

That is, on the receiving side of the transmitted contents data, the processing module for re-assembling the received packet and the processing module for decrypting the received data become more independent from each other. If the codec dependent header of the transmission contents data is also encrypted, the processing of decrypting the received data cannot be carried out on the downstream side of the processing of re-assembling the received packet. In the present embodiment, the processing of decrypting the received data can be carried out on the downstream side of the processing of depacketizing (re-assembling) the received packet. This diminishes the processing range for tamper-proofing.

Moreover, in the transmission relaying equipment for the encrypted contents data, the encrypted contents data may be re-packetized, without decryption, by efficient use of the non-encrypted codec dependent header. Thus, the functions provided by the codec dependent header may effectively be utilized, as the security of the transmitted contents data is maintained.

Since the codec dependent header is not encrypted, it is solely the transmitted contents data that is to be encrypted. Consequently, the same encrypted contents data may be locally used for both the processing, such as reproduction, and streaming.

Moreover, since the ancillary packetizing information, as defined from one codec to another (prescribed in RFC), is used, the information may directly be used without special extension on the client terminal side, such that special processing, including fragmentation (splitting) or interleaving (data re-arraying), is also possible.

It is to be noted that the present invention is not limited to the above-described embodiments, which are given only for the sake of illustration. That is, the present invention may be modified in a number of ways without departing from its scope. For example, although the contents data is in the form of an RTP packet, and distributed as a stream, in the above-described preferred embodiment, it may be re-packetized, because the codec dependent header is not encrypted. Hence, the data distributing side may be provided with means for eliminating the information needed solely for stream distribution, such as the RTP header, and for generating the depacketized data, to provide the enctrypted contents data which is not for stream distribution but which is for downloading. That is, two sorts of data, that is, the data for stream distribution and the data for downloading, may be obtained by appending the information dependent on the encoding system for the contents data, before encrypting the contents data, so that the data provided for stream distribution may be used as local data for downloading.

Although the hardware structure has been explained in the foregoing embodiments, the present invention is not limited thereto, such that any optional processing may be carried out by having a CPU (central processing unit) execute a corresponding computer program. In such case, the computer program may be recorded on a recording medium and provided as the pre-recorded recording medium, or may be transmitted over a transmission medium, such as the Internet.

Industrial Applicability

With the streaming system according to the present invention, described above, the functions provided by the encoding information may effectively be exploited as the security of the contents data is maintained. Thus, the encrypted contents data may be re-packetized, without decryption, by effective utilization of the non-encrypted encoding information in e.g. a transmission relaying apparatus for encrypted contents data.

On the contents data receiving side, the processing module for de-packetizing a received packet and the processing module for decrypting the received data may be rendered more independent from each other, and the processing for decrypting the received data may be carried out on the downstream side of the processing for depacketizing the received packet, whereby it is possible to diminish the scope of processing for tamper-proofing.

Moreover, since the encoding information is not encrypted, only the contents data are encrypted, so that the same encrypted contents data may be used for both the processing for local reproduction and the processing for streaming.

In addition, the ancillary information for packetizing, defined from one codec to another, may directly be used without any special standard extension.

The invention claimed is:

1. A receiving apparatus comprising:
   circuitry configured to
   send a request for a contents data,
   receive, in response to the request, one or more Real-time Transfer Protocol (RTP) packets formatted according to a data transfer protocol, from a streaming server,
   decrypt an encrypted contents data included in each received RTP packet by decrypting each RTP packet individually using packet specific encryption information, the decryption being performed based on an independently assigned non-encrypted cryptoheader for each RTP packet, and
   re-assemble the one or more received RTP packets by using non-encrypted encoding related information included in the one or more RTP packets.

2. The receiving apparatus of claim 1, wherein the encrypted contents data included in one or more received RTP packets are first re-assembled and then decrypted.

3. The receiving apparatus of claim 1, wherein the receiving apparatus receives a license managed by a license management entity in order to access the encrypted contents data.

4. The receiving apparatus of claim 3, wherein said license includes at least one of a cipher key to decrypt the encrypted contents data and user rights of the contents data.

5. The receiving apparatus of claim 1, wherein the non-encrypted encoding related information is a packet payload header.

6. The receiving apparatus of claim 1, wherein the encrypted contents data is encrypted in accordance with a counter-mode encryption system.

7. The receiving apparatus of claim 1, where the circuitry is further configured to receive a license from a license management entity, the license comprising at least one of a content encryption key to decrypt the encrypted contents data and user rights of the contents data.

8. A streaming method comprising:
   sending a request for a contents data;
   receiving, in response to the request, one or more Real-time Transport Protocol (RTP) packets formatted according to a data transfer protocol, from a streaming server;
   decrypting, using processing circuitry, an encrypted contents data included in each received RTP packet by decrypting each RTP packet individually using packet specific encryption information, the decryption being performed based on an independently assigned non-encrypted cryptoheader for each RTP packet; and
   re-assembling the one or more received RTP packets by using non-encrypted encoding related information included in the one or more RTP packets.

9. The method of claim 8, wherein the encrypted contents data included in the one or more received RTP packets are first re-assembled and then decrypted.

10. The method of claim 8, further comprising:
receiving a license managed by a license management entity in order to access the encrypted contents data.

11. The method of claim 10, wherein said license includes at least one of a cipher key to decrypt the encrypted contents data and user rights of the contents data.

12. The method of claim 8, wherein the non encrypted encoding related information is a packet payload header.

13. The method of claim 8, wherein the encrypted contents data is encrypted in accordance with a counter-mode encryption system.

14. The method of claim 8, further comprising:
receiving a license from a license management entity, the license comprising at least one of a content encryption key to decrypt the encrypted contents data and user rights of the contents data.

15. A streaming server sending apparatus comprising:
circuitry configured to
receive a request for a contents data, and
send, in response to the request, one or more Real-time Transfer Protocol (RTP) packets formatted according to a data transfer protocol, to a reception apparatus,
wherein the one or more RTP packets are encrypted to generate encrypted contents data, each RTP packet including an independently assigned non-encrypted cryptoheader identifying packet specific encryption information, and
wherein the one or more RTP packets include non-encrypted encoding related information enabling re-assembly of the one or more received RTP packets.

16. The server of claim 15, wherein the non-encrypted encoding related information is a packet payload header.

\* \* \* \* \*